US008990790B2

(12) United States Patent
Dawson et al.

(10) Patent No.: US 8,990,790 B2
(45) Date of Patent: Mar. 24, 2015

(54) JAVA NATIVE INTERFACE ARRAY HANDLING IN A DISTRIBUTED JAVA VIRTUAL MACHINE

(71) Applicant: International Business Machines Corporation, Armonk, NY (US)

(72) Inventors: Michael Hilton Dawson, Ottawa (CA); Xavier Rene Guerin, White Plains, NY (US); Megumi Ito, Yokohama (JP); Graeme Johnson, Ottawa (CA); Seetharami R Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 13/844,241

(22) Filed: Mar. 15, 2013

(65) Prior Publication Data
US 2014/0068579 A1    Mar. 6, 2014

Related U.S. Application Data

(63) Continuation of application No. 13/596,238, filed on Aug. 28, 2012, now abandoned.

(51) Int. Cl.
*G06F 9/45* (2006.01)
*G06F 9/455* (2006.01)
*G06F 9/54* (2006.01)

(52) U.S. Cl.
CPC ............ *G06F 9/45504* (2013.01); *G06F 9/547* (2013.01)
USPC .......................................... 717/148; 717/140

(58) Field of Classification Search
None
See application file for complete search history.

(56) References Cited

U.S. PATENT DOCUMENTS

| 6,662,362 | B1 | 12/2003 | Arora et al. |
| 7,353,504 | B2 | 4/2008 | Lagergren |
| 7,490,320 | B2 | 2/2009 | Kielstra et al. |
| 7,840,951 | B1 | 11/2010 | Wright et al. |
| 2006/0242635 | A1 | 10/2006 | Broussard et al. |
| 2011/0078709 | A1 | 3/2011 | Dawson et al. |
| 2014/0068572 | A1* | 3/2014 | Dawson et al. ............... 717/140 |

OTHER PUBLICATIONS

Stepanian, Levon, et al., "Inlining Java Native Calls At Runtime," In Proc. 1st ACM/USENIX Conference on Virtual Execution Environments, 2005.
IBM, "DeleteLocalReference roundtrip optimization when implementing JNI Offload in a JVM," Disclosure No. IPCOM000190097D, Nov. 17, 2009.

* cited by examiner

*Primary Examiner* — Chuck Kendall
(74) *Attorney, Agent, or Firm* — Nelson and Nelson; Daniel P. Nelson; Alexis V. Nelson

(57) ABSTRACT

A method for executing native code in a distributed Java Virtual Machine (JVM) is disclosed herein. The method may include receiving, in a first thread executing in a remote execution container, a first native code-generated call, such as a Java Native Interface (JNI) call, to a second thread, the first call including a first array write request. The first call may be stored in an instruction cache and bundled with a second native code-generated call and sent to the second thread. The calls are unbundled and executed in the second thread. An opaque handle to an array returned by the second call is bundled with corresponding array data and returned to the first thread. The array data of the bundle is stored in a data cache and retrieved in response to requests for the array data addressed to the second thread. A corresponding computer program product is also disclosed.

20 Claims, 10 Drawing Sheets

JAVA NATIVE INTERFACE ARRAY HANDLING IN A DISTRIBUTED JAVA VIRTUAL MACHINE

BACKGROUND

1. Field of the Invention

This invention relates to the Java Virtual Machine, and more particularly to methods for executing native code in a distributed Java Virtual Machine supporting the Java Native Interface (JNI).

2. Background of the Invention

Implementations of the Java Virtual Machine (JVM) support the Java Native Interface (JNI) as a mechanism to enable Java bytecode to call methods written in native code (e.g., C and C++) and vice versa. Traditionally, both the Java bytecode and the native code are executed in the same process and by the same thread as execution transitions between the two.

It is possible, however, to construct a JVM to execute native code in one or more remote execution containers, which may be executed within separate threads on the same or different machine from where the Java bytecode is executed. In such environments, the native code may not be aware that it is executing separately from the JVM. Separating the Java bytecode and native code in this manner may help to prevent misbehaved native code from destabilizing the JVM. It may also enable the native code to run in a different environment (e.g., security context, bit width, etc.) than the JVM.

Function calls from a JNI process of a remote execution container to a JVM typically have relatively high latency, particularly for operations in which one or both of input and output data is an array. In particular, function calls from the JNI to the JVM typically require at least three round trip communications: a first call to provide an input array to the JVM, a second call to invoke a function operating on the array, and a third call to request an array modified or created as a result of the function.

In view of the foregoing, what are needed are methods to reduce the latency of function calls from a JNI process to a remote JVM.

SUMMARY

The invention has been developed in response to the present state of the art and, in particular, in response to the problems and needs in the art that have not yet been fully solved by currently available methods. Accordingly, the invention disclosed herein has been developed to provide methods to execute native code in a distributed Java Virtual Machine (JVM) with low latency. The features and advantages of the invention will become more fully apparent from the following description and appended claims, or may be learned by practice of the invention as set forth hereinafter.

Consistent with the foregoing, a method for executing native code in a distributed JVM is disclosed herein. In one embodiment, such a method includes receiving, in a first thread in a remote execution container, a first native code-generated call, such as a Java Native Interface (JNI) call, to a second thread in a distributed JVM, the first native code-generated call including a first array write request. In response to receiving the first native code-generated call, the first native code-generated call is stored in an instruction cache. A second native code-generated call to the second thread is also received. The second native code-generated call may include a first function call from a first calling function, where the first function call is not an array write request. In response to receiving the second native code-generated call, the first and second native code-generated calls may be bundled together and the bundled first and second native code-generated calls may be transmitted to the second thread.

Upon receiving the bundled first and second native code-generated calls, the second thread may then unbundle the first and second native code-generated calls and execute them both in the second thread. In some embodiments, the first function call may output a return value referencing an output array. In response to output of the return value, the return value and the output array may be bundled and transmitted to the first thread.

Upon receiving the bundled return value and output array, the first thread may extract the output array and store it in a data cache. The return value may likewise be extracted and returned to the first calling function.

Other methods and implementation details are also disclosed and claimed. A corresponding computer program product is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
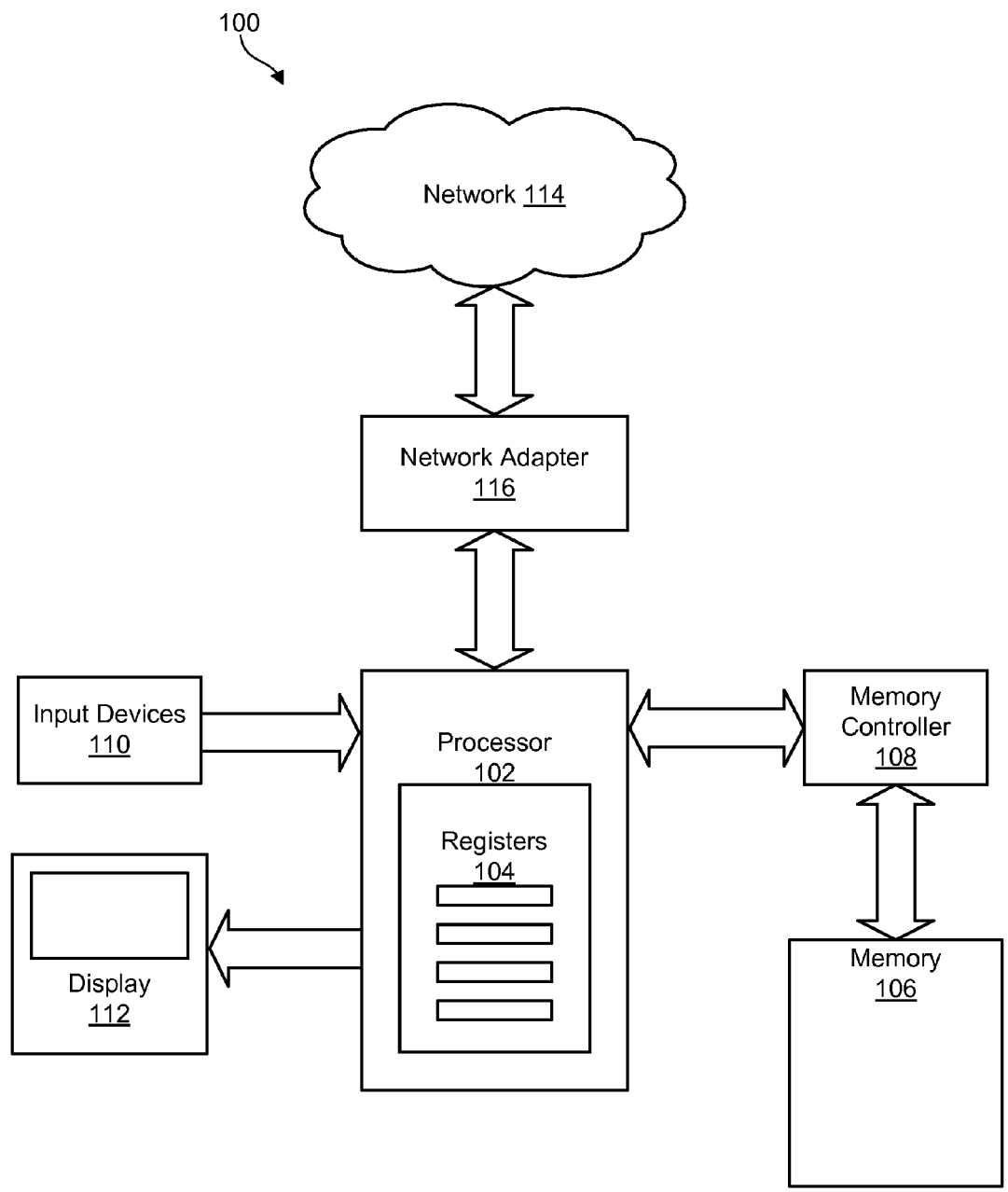
FIG. 1 is a high-level block diagram showing one example of a computer system suitable for use with various embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where techniques in accordance with the invention may be implemented. The computer system 100 is presented only by way of example and is not intended to be limiting. Indeed, the techniques disclosed herein may be applicable to a wide variety of different computer systems in addition to the computer system 100 shown. The techniques disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
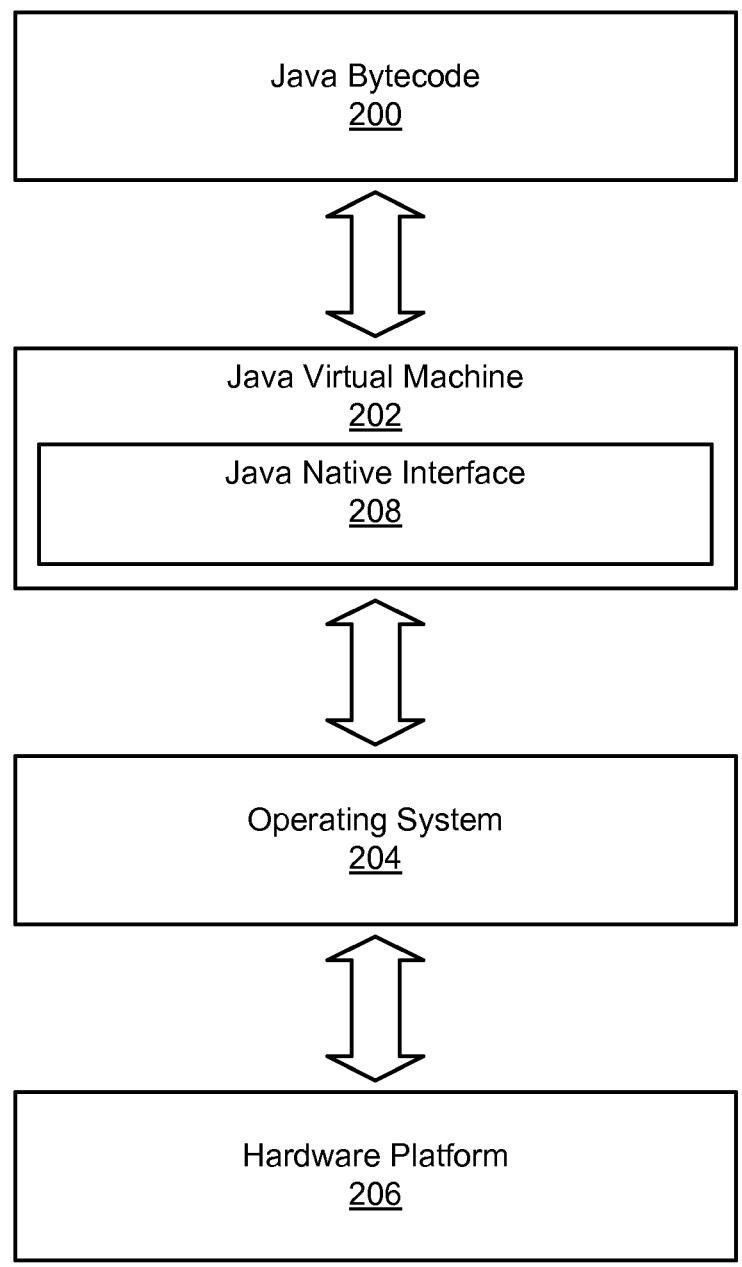
FIG. 2 is a high-level block diagram showing one example of an object-oriented managed runtime, in this example the Java Virtual Machine (JVM)

Referring to FIG. 2, one example of an object-oriented managed runtime, in this example a Java Virtual Machine, is illustrated. The Java Virtual Machine is presented to show one example of a runtime environment in which various embodiments of the invention may operate. Nevertheless, the techniques disclosed herein are not limited to the Java Virtual Machine but may operate or be adapted to operate in other object-oriented managed runtimes. Other non-limiting examples of runtime environments in which embodiments of the invention might operate include the Microsoft Common Language Runtime (CLR) and Smalltalk runtime. Thus, although particular reference is made herein to the Java Virtual Machine, the principles taught herein are not limited to the Java Virtual Machine but may also be applicable to other runtime environments.

As shown in FIG. 2, a Java Virtual Machine 202 may be configured to operate on a specific platform, which may include an underlying hardware and operating system architecture 204, 206. The Java Virtual Machine 202 receives program code 200, compiled to an intermediate form referred to as "bytecode" 200. The Java Virtual Machine 202 translates this bytecode 200 into native operating system calls and machine instructions for execution on the underlying platform 204, 206. Instead of compiling the bytecode 200 for the specific hardware and software platform 204, 206, the bytecode 200 is compiled once to operate on all Java Virtual Machines 202. A Java Virtual Machine 202, by contrast, may be tailored to the underlying hardware and software platform 204, 206. In this way, the Java bytecode 200 may be considered platform independent.

As shown, the Java Virtual Machine 202 may support the Java Native Interface 208 as a mechanism to enable Java bytecode 200 to call methods written in native code (e.g., C and C++) and vice versa. Unlike the Java bytecode 200, the native code may be written for the underlying hardware and operating system platform 204, 206. The Java Native Interface 208 may allow a developer to write native methods to handle situations where an application cannot be written entirely in the Java programming language, such as when the Java class library does not support platform-specific features or program libraries. The Java Native Interface 208 may also be used to modify an existing application—written in another programming language—to be accessible to Java applications. The Java Native Interface 208 may allow native methods to create and use Java objects in the same way that Java code creates and uses such objects. A native method may also inspect and use objects created by Java application code.

Figure 3:
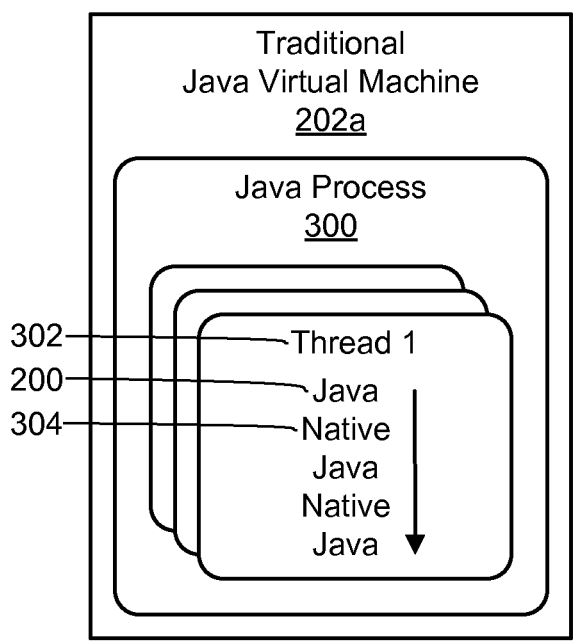
FIG. 3 is a high-level block diagram showing an example of a traditional Java Virtual Machine running both Java bytecode and native code.

Referring to FIG. 3, as previously mentioned, traditionally, both the Java bytecode 200 and the native code 304 are executed in the same process 300 and by the same thread 302 as execution transitions between the two. FIG. 3 shows a high-level view of a traditional Java Virtual Machine (JVM) 202a. As shown, in a single Java process 300, execution alternates between the Java bytecode 200 and the native code 304 as the Java bytecode 200 calls the native code 304 and vice versa.

Figure 4:
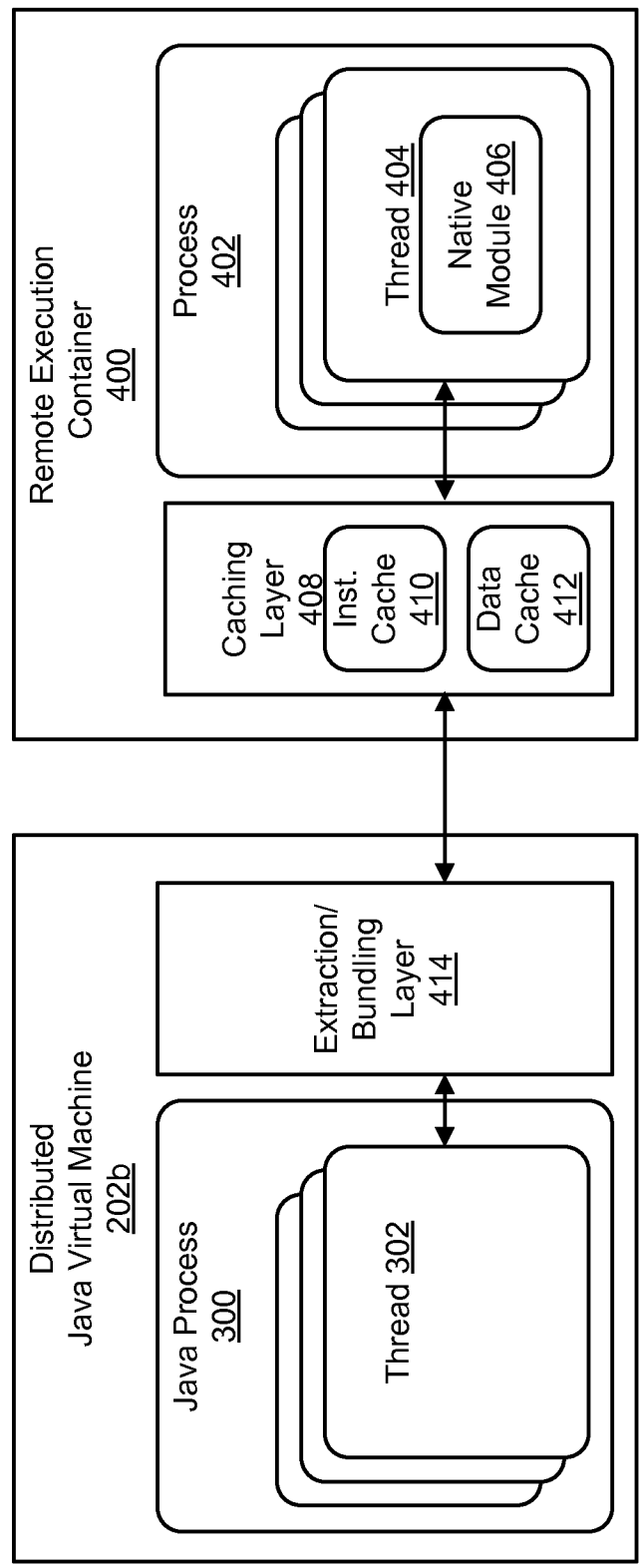
FIG. 4 is a high-level block diagram of a distributed JVM with caching and extracting layers for decreasing latency.

Referring to FIG. 4, in a distributed environment, a distributed JVM 202b operates in conjunction with a remote execution container 400. The remote execution container 400 may operate in a different thread, different process, or different machine than the JVM 202b. In such an environment, a thread 302 executing within the distributed JVM 202b may execute both local function calls and function calls received from the remote execution container. Likewise, instructions to be executed within the remote execution container may be invoked from within the thread 302 and transmitted to the remote execution container 400. In some embodiments, instantiation of the remote execution container 400 may be invoked by the JVM 202b, such as by an instruction within the thread 302. Alternatively, a remote execution container 400 may be instantiated manually or according to some other process and linked or otherwise presented to the JVM 202b for use.

The remote execution container 400 may execute a process 402 including one or more threads 404. A native module 406 may execute within the thread 404. The native module 406 may include native code invoked by, and interacting with the thread by means of, the Java Native Interface (JNI) implemented by the thread 404. Native code functions may be invoked through the JNI to be executed by the native module 406. Likewise, the native module 406 may invoke Java functions through the JNI to be executed by the distributed JVM 202b in a thread 302 or some other process.

In the illustrated embodiment, the remote execution container 400 includes a caching layer 408 that has an instruction cache 410 and a data cache 412 associated therewith. The caching layer 408 represents functionality of the remote execution container 400 for processing instructions passing to and from the remote execution container 400 and may or may not be embodied as an actual distinct module or logical grouping of instructions or functionality. The distributed JVM 202b may include an extraction/bundling layer 414. The extraction/bundling layer 414 likewise represents functionality of the distributed JVM 202b for processing instructions passing to and from the distributed JVM 202b and may or may not be embodied as an actual distinct module or logical grouping of instructions or functionality.

The functionality of the caching layer 408 and extraction/bundling layer 414 will be discussed in extensive detail hereinbelow. In particular, the caching layer 408 may implement functionality discussed hereinbelow relating to caching of outgoing array write requests from the remote execution container 400, bundling cached requests with JNI function call requests to be sent to the distributed JVM 202b, and caching incoming data received from the distributed JVM 220b. Likewise, the extraction/bundling layer 414 may implement functionality discussed hereinbelow relating to extracting array write requests and other JNI function call requests from bundles received from the remote execution container 400 and bundling array data with return values to be sent to the remote execution container 400.

The methods disclosed herein reduce latency due to array write and read requests. Example of JNI callbacks that may advantageously processed according to the methods disclosed herein include: GetBooleanArrayRegion, GetByteArrayRegion, GetCharArrayRegion, GetShortArrayRegion, GetIntArrayRegion, GetLongArrayRegion, GetFloatArrayRegion, GetDoubleArrayRegion, SetBooleanArrayRegion, SetByteArrayRegion, SetCharArrayRegion, SetShortArrayRegion, SetIntArrayRegion, SetLongArrayRegion, SetFloatArrayRegion, SetDoubleArrayRegion, GetBooleanArrayElements, GetByteArrayElements, GetCharArrayElements, GetShortArrayElements, GetIntArrayElements, GetLongArrayElements, GetFloatArrayElements, GetDoubleArrayElements, ReleaseBooleanArrayElements, ReleaseByteArrayElements, ReleaseCharArrayElements, ReleaseShortArrayElements, ReleaseIntArrayElements, ReleaseLongArrayElements, ReleaseFloatArrayElements, and ReleaseDoubleArrayElements.

Figure 5:
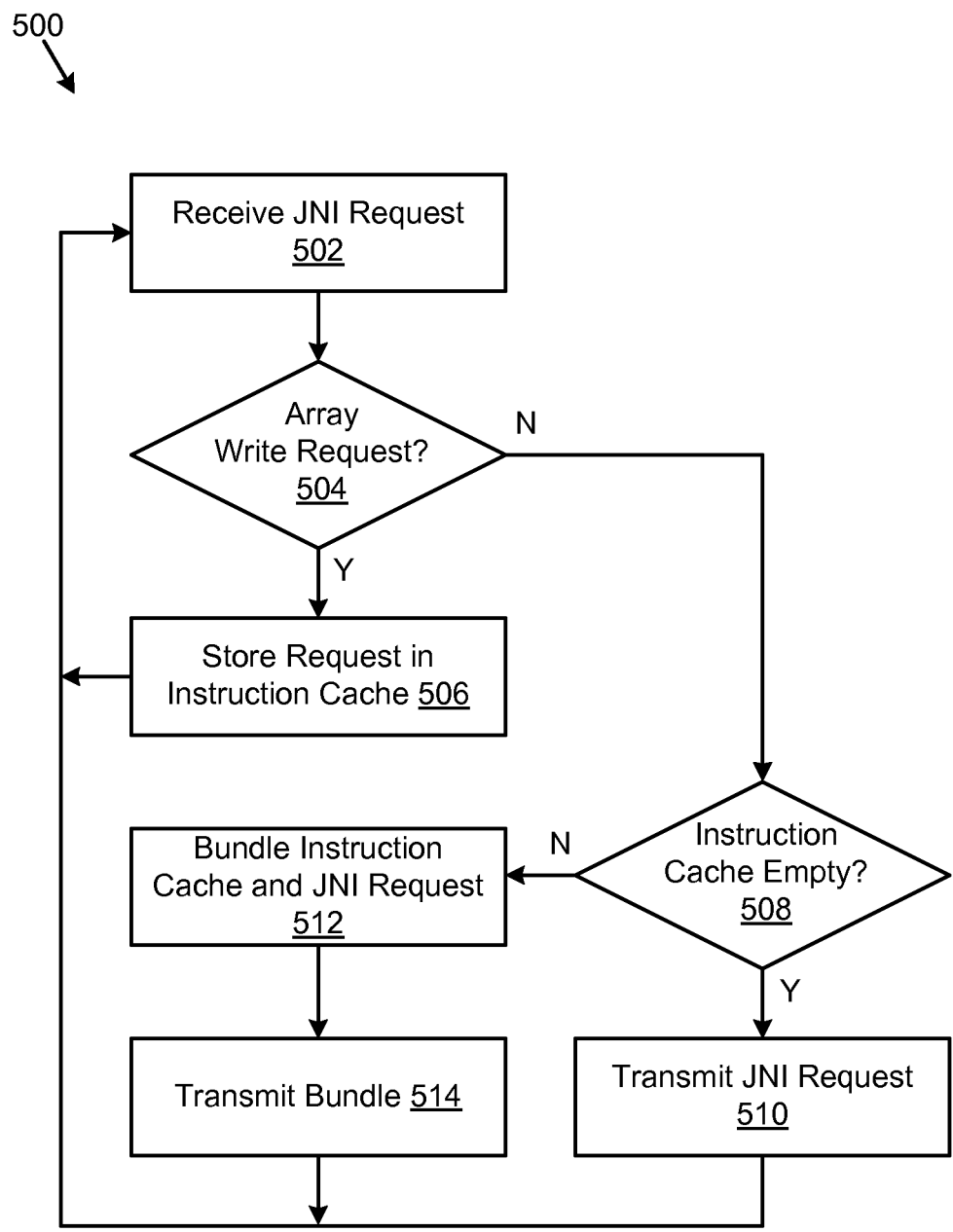
FIG. 5 is a process flow diagram of a method for processing an array write request from native code in a distributed JVM.

FIG. 5 illustrates a method 500 for processing instructions received from, for example, a native module 406 executing native code. The instructions may be Java instructions received through a JNI implemented in a remote execution container 400. Accordingly, the method 500 includes receiving 502 a JNI function call request. If the JNI function call request is determined 504 to be an array write request, then the request may be stored 506 in the instruction cache 410. Multiple array write requests may be stored 506 in the instruction cache 410 before the contents of the cache are transmitted to the distributed JVM 202b, such as for execution in a thread 302.

If the JNI function call request is determined 504 to be an request other than an array write request, then the method 500 may evaluate 508 whether the instruction cache 410 is empty. If so, the JNI function call request may be transmitted 510 to the distributed JVM 202b for processing. If not, any JNI function call requests in the instruction cache 410 may be bundled 512 with the received JNI function call request and the bundle may be transmitted 514 to the distributed JVM for processing. The above functionality reduces latency by omitting the round trip required to transmit the array to the distributed JVM 202b.

In some embodiments, a calling function that generates an array write request may expect a return value or other acknowledgment of transmission of the array and may hang until such acknowledgment is received. In such embodiments, storing 506 the array transmit request in the instruction cache may additionally include returning a return value or acknowledgment confirming transmission to the calling function.

Figure 6:
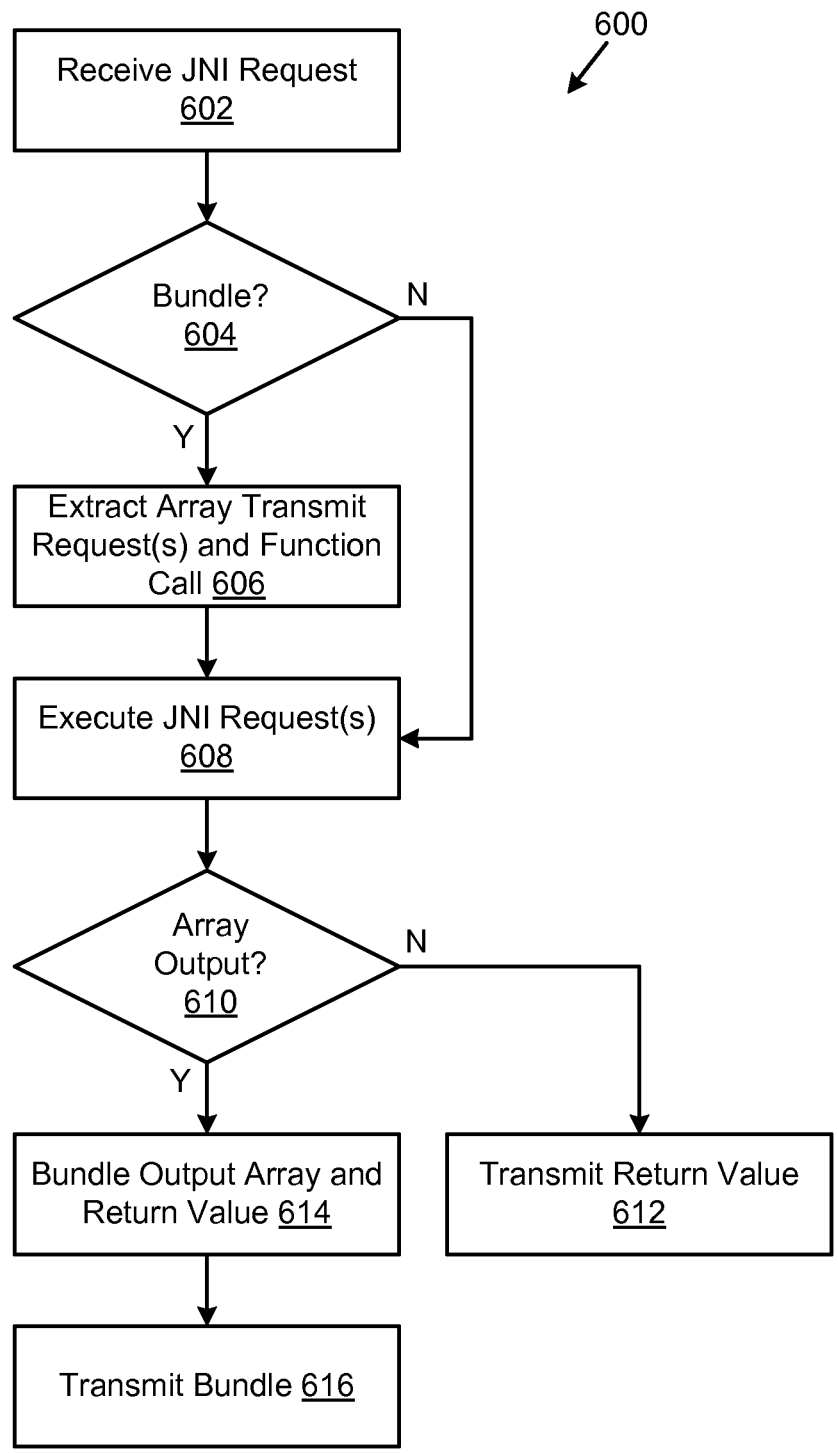
FIG. 6 is a process flow diagram of a method for processing a bundled array write request and function call in a distributed JVM.

FIG. 6 illustrates a method 600 for processing JNI function call requests or bundles of JNI function call requests received by a distributed JVM 202b from a remote execution container 400. The method 600 includes receiving 602 an JNI function call request from the distributed execution container 400 and evaluating 604 whether the JNI function call request is a bundle of JNI function call requests. If so, then any array write requests and any other function calls are extracted 606 from the bundle. In either case, the JNI function call request or bundle of JNI function call requests are executed 608. Executing 608 the JNI function call requests in the bundle may be performed within the thread 302 of the distributed JVM 202b.

Where the bundle includes array write requests, the arrays included in the requests may first be written to a memory space or used to overwrite array data for an array specified in the request. The JNI function call request included in the bundle may be executed after the array data has been written to the memory space or overwritten existing array data. This ordering may be used to ensure that, upon execution, the function call identified in the JNI function call request is operating on current data.

A return value of the function call may be evaluated 610. If the return value is not an array or opaque handle to an array or array object, the return value may be transmitted 612 to the remote execution container 400 for return to the thread 404 and corresponding native module 406. If the output is an array, typically embodied as an opaque handle to an array or array object, then the array data and the return value may be bundled 614 and the bundle transmitted 616 to the remote execution container 400 for return to the thread 404 and corresponding native module 406.

Figure 7:
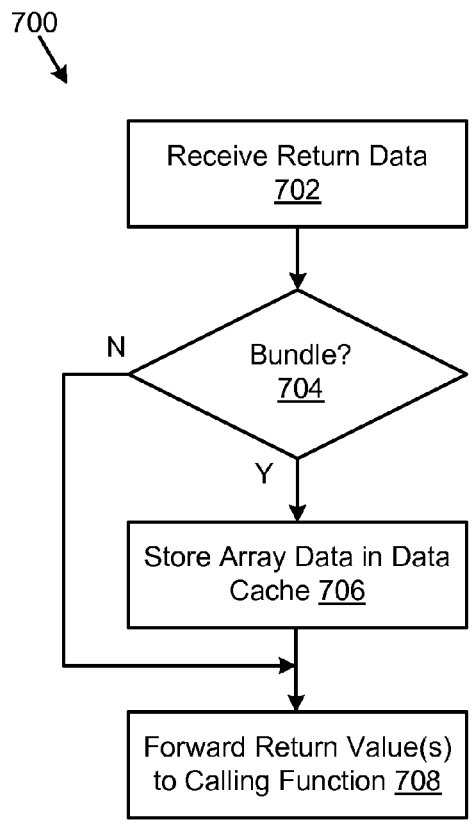
FIG. 7 is a process flow diagram of a method for caching received array data in a distributed JVM.

FIG. 7 illustrates a method 700 for processing data returned from a distributed JVM 202b to a remote execution container 400. The return data may be received 702 and evaluated 704 to determine whether the return data is a return value or a bundle. If the return data is a bundle, then array data may be extracted and stored 706 in the data cache 412. In either case, a return value in the return data may be forwarded 708 to a calling function, such as by forwarding the return value to a calling function in the native module 406 executing within the thread 404.

Figure 8:
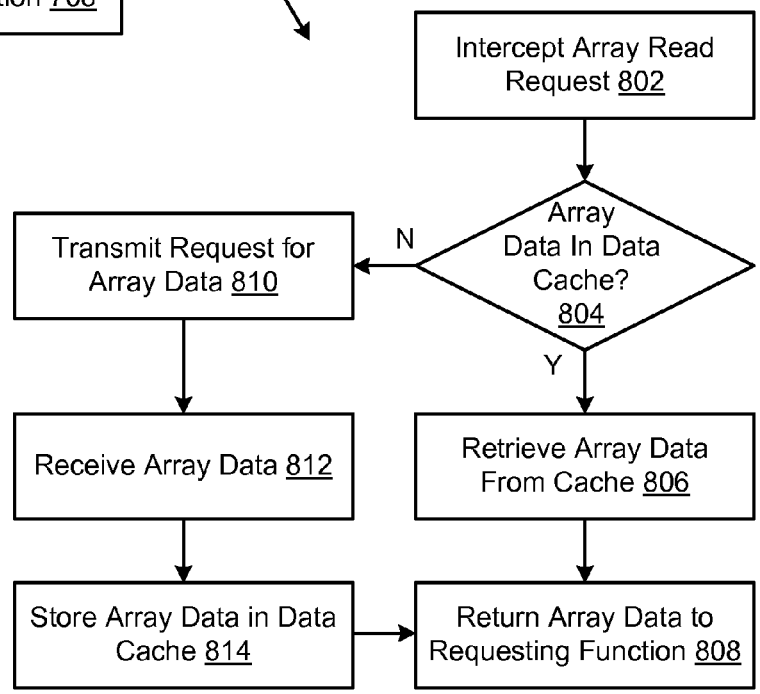
FIG. 8 is a process flow diagram of a method for responding to array read requests using cached array data in a distributed JVM.

FIG. 8 illustrates a method 800 for using cached array data. The method 800 includes receiving 802 an array read request, which may include receiving any type of array read request. The request to read array data may be received by the thread 404 from the native module 406 and intercepted by the caching layer 408.

The request to read array data may be evaluated 804 with respect to array data stored in the data cache 412. If the array data corresponding to the request is found 804 to be stored in the data cache 412, then the array data is retrieved 806 from the cache and returned 808 to the requesting function, such as a function within the native module 406 executed within the thread 404. If the requested array data is not found 804 to be stored in the data cache 412, then the request for array data may be transmitted 810 to the distributed JVM 202b and processed to retrieve the requested data. This may include retrieving the data using the thread 302. The requested data is then transmitted to the remote execution container 400, which receives 812 the array data. The received array data may be stored 814 in the data cache 412 and returned 808 to the requesting function.

The method 800 advantageously omits a round trip required to retrieve the array data inasmuch as the array data may have been previously received in a bundle with a return value pointing to the array containing the array data.

Figure 9:
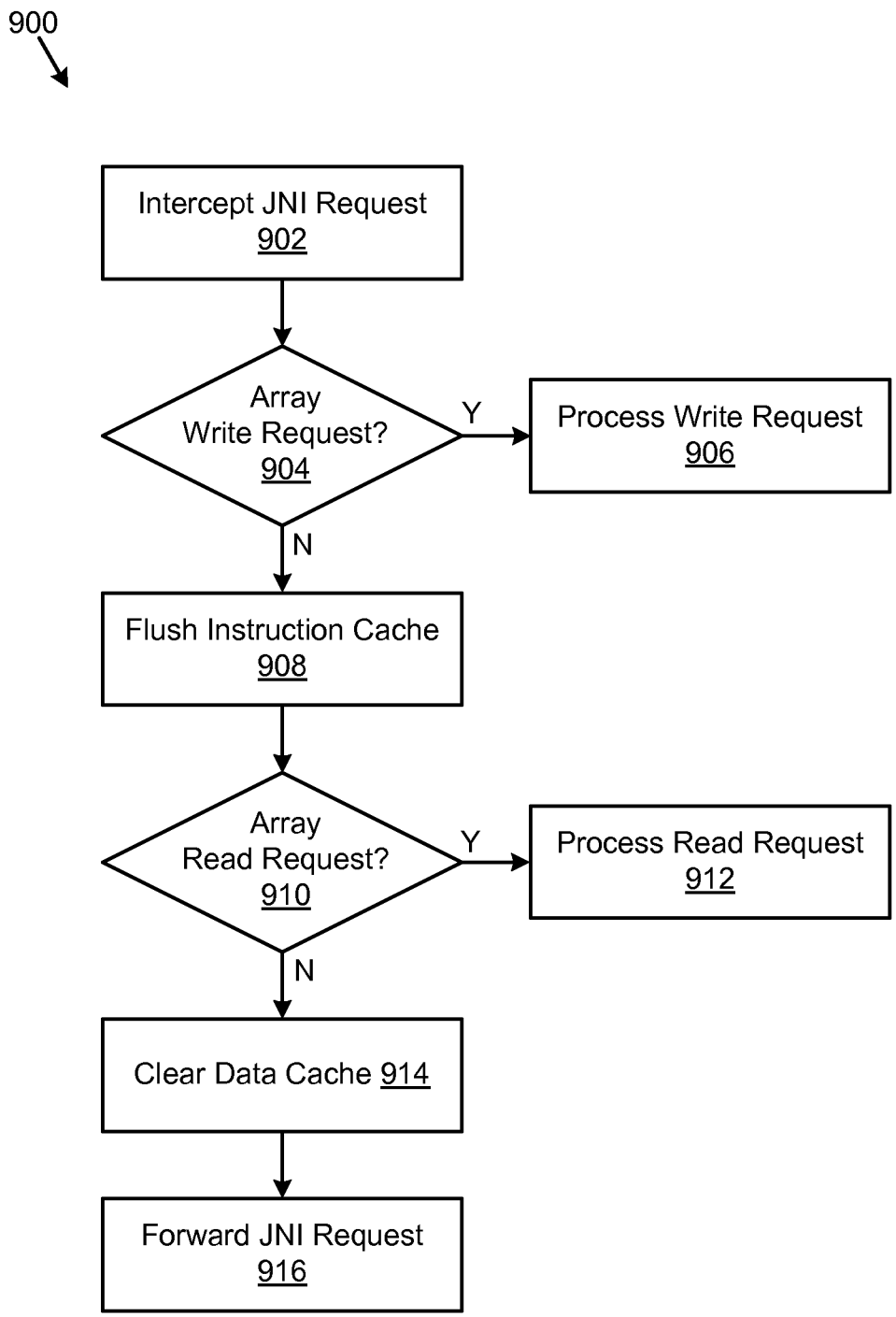
FIG. 9 is a process flow diagram of a method for managing data and instruction caches in a distributed JVM.

FIG. 9 illustrates a method 900 for managing data and instruction caches to maintain data consistency. The method 900 includes intercepting 902 a JNI function call request, such as a JNI function call request originating from a native module 406. If the JNI function call request is found 904 to be an array write request, then the JNI function call request may be processed 906 according to the methods disclosed herein for processing array write requests. For example processing 906 may include executing the method 500. In some embodiments, processing 906 a write request referencing an array may include updating data corresponding to that array in the data cache 412 so that the data cache 412 is kept current. If the intercepted instruction is determined 904 to be other than an array write or read request, then the instruction cache 410 may be flushed 908. Flushing 908 the instruction cache 410 may include bundling any array transmit instructions in the cache 410 with the intercepted 902 JNI function call request.

The method 900 may further include evaluating 910 whether the JNI function call request is an array read request. If so, then the array read request may be processed 912 according to methods disclosed herein, such as according to the method 800. If the intercepted JNI function call request is not found 910 to be an array read request, the data cache 412 may be cleared 914. Clearing 914 the data cache 412 may include deleting cached arrays and array data from the cache or simply marking stored array data as invalid or stale.

The intercepted JNI function call request may be forwarded 916 to the distributed JVM, such as to the thread 302 executing in the distributed JVM 202b. This may include forwarding a bundle including both the intercepted JNI function call request and any cached array transmit requests flushed 908 from the instruction cache 410.

As noted above, the method 900 may be used to ensure data consistency. In particular, the method 900 may be used in some embodiments to ensure consistency of data operated upon by multiple threads. To ensure threadsafe operation a developer may include special code ensuring that certain operations are performed according to a given order among different threads or to ensure that no changes to operational data are performed at critical stages in a program. These coordinating steps typically require a function call from the native module through the JNI. Accordingly, by flushing an instruction cache and clearing a data cache for JNI function call requests according to the method 900, write instructions may advantageously be executed and invalid data purged to facilitate threadsafe operation in response to these function calls for coordinating multithreaded operation. In particular, the "MonitorEnter" and "MonitorExit" function calls in Java may trigger flushing and clearing of caches and thereby facilitate consistent data between threads. In some embodiments, one or both of the instruction and data caches may be flushed or cleared in response to JNI function call requests that will require the execution of Java code. In such embodiments, JNI function call requests that will not invoke the execution of Java code in the Distributed JVM may be processed such that they do no trigger flushing of the instruction cache or clearing of the data cache.

In some embodiments, native code may require data consistency between different threads where Java callbacks are not generated to coordinate operation. This may be the case where native code modules operating in separate threads are operating on data in the same memory space. In such embodiments, a developer may flag modules or functions that operate in this manner as ineligible for one or both of caching write instructions and caching received array data or using cached array data according to the methods described herein. In some embodiments, such functions or modules may be detected upon compilation, loading for execution, or execution, and flagged as ineligible at this time. Any other function or module that a developer wishes not to take advantage of methods disclosed herein may also be flagged as ineligible. One or both of the caching layer 408 and the extraction and bundling layer 414 may evaluate such flags and function accordingly. In some embodiments, a developer or user may specify that a distributed JVM in its entirety or an entire application operating on a distributed JVM is not to perform the latency-reducing methods described herein.

Figure 10:
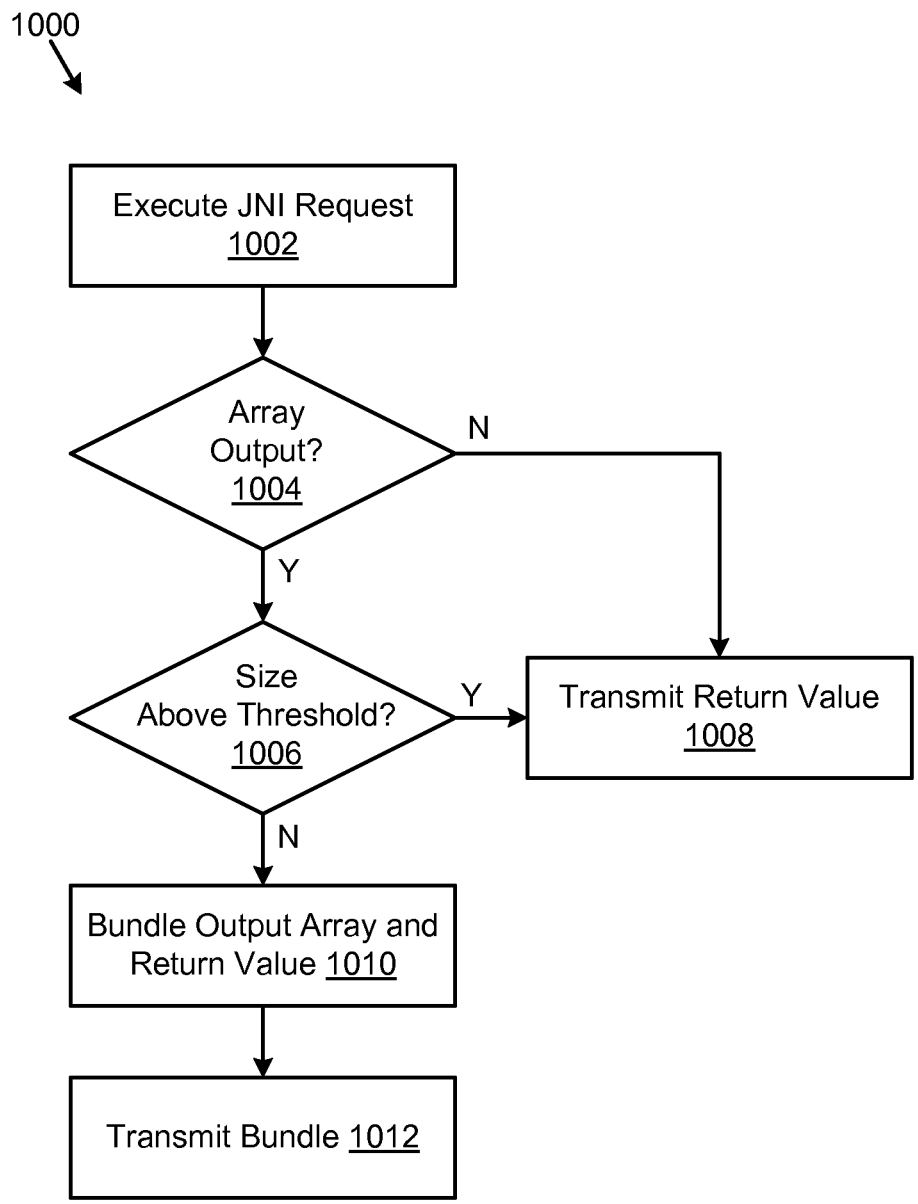
FIG. 10 is a process flow diagram of a method for bundling array data with a return value in a distributed JVM.

Referring to FIG. 10, the methods disclosed herein are particularly useful where the time required to transmit an array between the distributed JVM 202b and the remote execution container 400 is on the order of the latency of communication therebetween. Where the array transferred is very large, the methods disclosed herein may introduce delays. Accordingly, the method 1000 may be used to help avoid such delays.

The method 1000 may include executing 1002 a JNI function call request in a distributed JVM 202b, such as within a thread 302. If the return value of the function call of the JNI function call request is found 1004 to be an array or opaque handle to an array, the size of the array may be evaluated 1006. If the array size is larger than a threshold or the return value of the instruction is not an array, the return value 1008 may be returned to the remote execution container 400, such as for processing by the native module 406 executing within a thread 404.

If the size of the array corresponding to the return value is not found 1006 to be larger than a threshold value, then the array and return value may be bundled 1010 and transmitted 1012 to the remote execution container 400 for processing according to the methods disclosed herein, such as the method 700.

Figure 11:
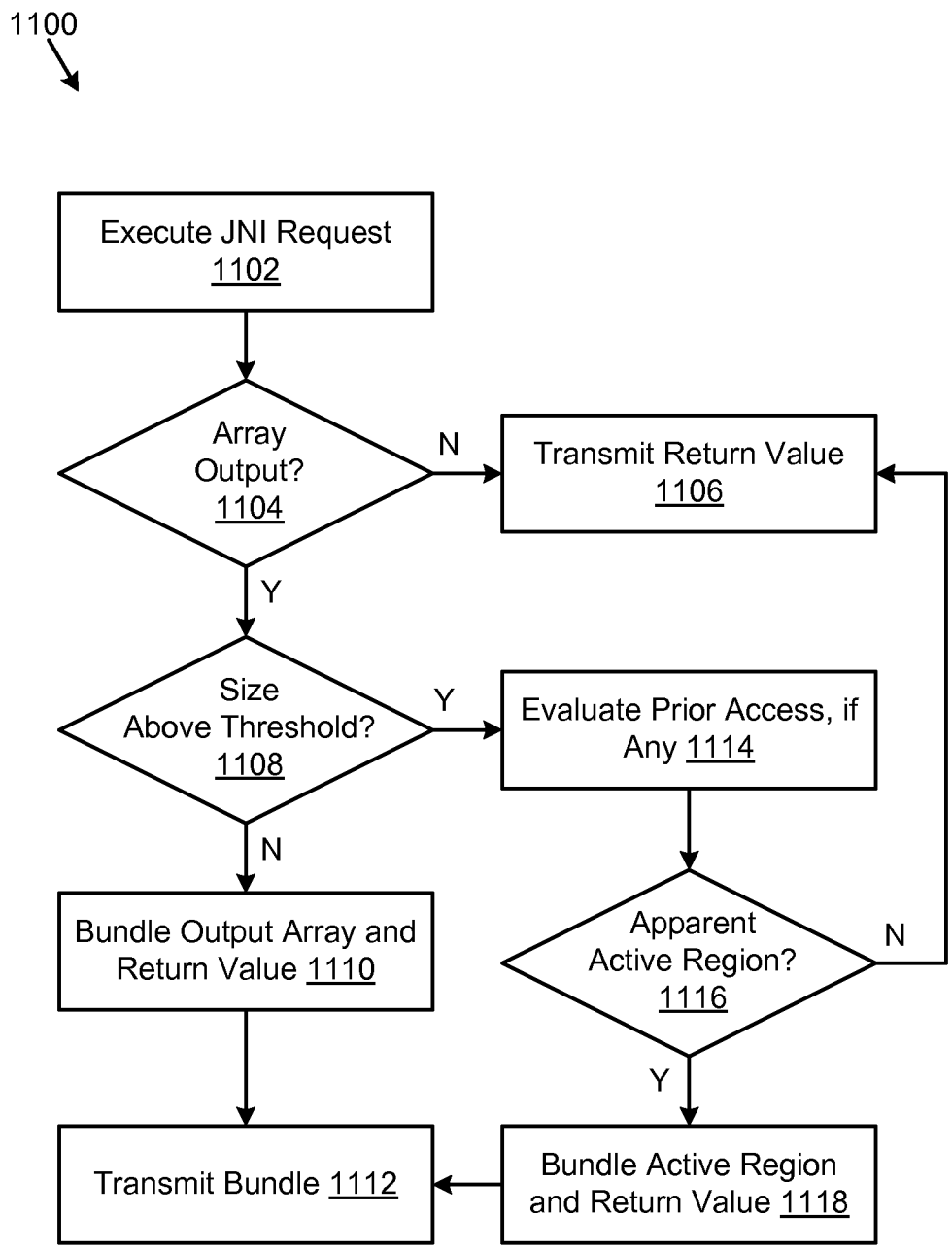
FIG. 11 is a process flow diagram of an alternative method for bundling array data with a return value in a distributed JVM.

FIG. 11 illustrates an alternative method 1100 for dealing with large arrays. The method 1100 may include executing 1102 a JNI function call request in a distributed JVM 202b, such as within a thread 302. If the return value of the function call of the JNI function call request is not found 1104 to be an array or opaque handle to an array, the return value 1106 may be returned to the remote execution container 400, such as for processing by the native module 406 executing within a thread 404.

If the return value is found to be an array or opaque handle to an array, the size of the corresponding array may be evaluated 1108. If the array size is found 1108 to be smaller than a threshold size, the array may be bundled 1110 with the return value and transmitted 1112 to the remote execution container 400 for processing according to the methods disclosed herein, such as the method 700.

If the array size is found 1108 to be larger than the threshold size, the method 1100 may evaluate 1114 prior access to the array, if any. If prior access, if any, is found 1116 to indicate that a particular area of the array referenced by the return value is an active region, then the active region, or a portion of the array that has a size according to the threshold and includes some or all of the active region, may be bundled 1118 with the return value for transmission 1112 to the remote execution container as already discussed. If there is no apparent active region, then the return value may be returned 1106 without any array data.

Various modifications and alternatives to the method 1100 may also be used. For example, an apparent active region may be identified based on actual accesses to an array. This may include evaluating a region of an array identified in requests to retrieve array data. Once one or more of these requests have been received, the requested region of the most recent or an aggregation of the requested regions for multiple recent requests, may be used as the active region. Alternatively, where no data or sparse data exists for usage of an array, an apparent active region may be inferred from usage of other arrays. For example, if a pattern is apparent that only the first N values of large arrays are used most frequently, then the first values of an array up to the threshold size may be used as the apparent active region for the array.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for executing native code in a distributed Java Virtual Machine (JVM), the method comprising:
    receiving, in a first thread, a first native code-generated call to a second thread, the first call including a first array write instruction, the first thread executing in a remote execution container with respect to the second thread;
    in response to receipt of the first native code-generated call, storing the first native code-generated call in an instruction cache;
    receiving, in the first thread, a second native code-generated call to the second thread, the second native code-generated call including a first function call, that is not an array write instruction, from a first calling function; and
    in response to receipt of the second native code-generated call, bundling the first and second native code-generated calls and transmitting the bundled first and second native code-generated calls to the second thread.

2. The method of claim 1, further comprising:
    receiving the bundled first and second native code-generated calls in a second thread;
    unbundling the first and second native code-generated calls;
    executing the first array write instruction in the second thread; and
    executing the first function call in the second thread.

3. The method of claim 2, further comprising:
    outputting from the first function call a return value referencing an output array;
    in response to output of the return value, bundling the return value and the output array; and transmitting the bundled return value and output array to the first thread.

4. The method of claim 3, further comprising:
extracting, in the first thread, the output array and return value from the bundled return value and output array;
storing the output array in a data cache; and
returning the return value to the first calling function.

5. The method of claim 4, further comprising:
receiving, in the first thread, a third native code-generated call including an array read request to access the output array;
intercepting the native code-generated call in the first thread; and
returning the output array from the data cache in response to the array read request.

6. The method of claim 4, further comprising:
receiving, in the first thread, a third native code-generated call including a second function call that is not an array write or array read request; and
in response to receiving the third native code-generated call, clearing the data cache.

7. The method of claim 4, further comprising:
in response to receiving the third native code-generated call, transmitting any instructions stored in the instruction cache to the second thread.

8. The method of claim 2, further comprising:
outputting from the first function call a return value referencing an output array;
in response to output of the return value, evaluating a size of the output array; and
if the size of the output array does not exceed a size threshold, transmitting a bundle including the return value and the output array to the first thread, otherwise, transmitting the return value to the first thread.

9. The method of claim 2, further comprising:
outputting from the first function call a return value referencing an output array;
in response to output of the return value, evaluating a size of the output array; and
if the size of the output array exceeds a size threshold, identifying an active region of the output array and transmitting a bundle including the return value and the active region to the first thread, otherwise, transmit a bundle including the return value and the output array to the first thread.

10. The method of claim 1, further comprising:
receiving, in the first thread a third native code-generated call to the second thread, the third native code-generated call including a second array write instruction, the third native code-generated call received after the first native code-generated call but before the second native code-generated call;
in response to receipt of the third native code-generated call, storing the third native code-generated call in the instruction cache; and
wherein bundling the first and second native code-generated call and transmitting the bundled first and second native code-generated call to the second thread further comprises bundling the first, second, and third native code-generated calls and transmitting the bundled first, second, and third native code-generated calls to the second thread.

11. A computer program product to execute native code in a distributed Java Virtual Machine (JVM), the computer program product comprising a computer-readable storage medium having computer-usable program code embodied therein, the computer-usable program code comprising:

computer-usable program code to receive, in a first thread, a native code-generated call to a second thread, the first native code-generated call including a first array write instruction, the first thread executing in a remote execution container with respect to the second thread;
computer-usable program code to, in response to receipt of the first native code-generated call, store the first native code-generated call in an instruction cache;
computer-usable program code to receive, in the first thread, a second native code-generated call to the second thread, the second native code-generated call including a first function call, that is not an array write instruction, from a first calling function; and
computer-usable program code to, in response to receipt of the second native code-generated call, bundle the first and second native code-generated calls and transmit the bundled first and second native code-generated calls to the second thread.

12. The computer program product of claim 11, further comprising computer-usable program code to:
receive the bundled first and second native code-generated calls in a second thread;
unbundle the first and second native code-generated calls;
execute the first array write instruction in the second thread; and
execute the first function call in the second thread.

13. The computer program product of claim 12, further comprising computer-usable program code to:
output from the first function call a return value referencing an output array;
in response to output of the return value, bundle the return value and the output array; and
transmit the bundled return value and output array to the first thread.

14. The computer program product of claim 13, further comprising computer-usable program code to:
extract, in the first thread, the output array and return value from the bundled return value and output array;
store the output array in a data cache; and
return the return value to the first calling function.

15. The computer program product of claim 14, further comprising computer-usable program code to:
receive, in the first thread, a third native code-generated call including an array read request to access the output array;
intercept the native code-generated call in the first thread; and
return the output array from the data cache in response to the array read request.

16. The computer program product of claim 14, further comprising computer-usable program code to:
receive, in the first thread, a third native code-generated call including a second function call that is not an array write or array read request; and
in response to receiving the third native code-generated call, clear the data cache.

17. The computer program product of claim 14, further comprising computer-usable program code to:
in response to receiving the third native code-generated call, transmit any instructions stored in the instruction cache to the second thread.

18. The computer program product of claim 12, further comprising computer-usable program code to:
output from the first function call a return value referencing an output array;
in response to output of the return value, evaluate a size of the output array; and if the size of the output array does not exceed a size threshold, transmit a bundle including the return value and the output array to the first thread, otherwise, transmit the return value to the first thread.

19. The computer program product of claim 12, further comprising computer-usable program code to:
output from the first function call a return value referencing an output array;
in response to output of the return value, evaluate a size of the output array; and
if the size of the output array exceeds a size threshold, identify an active region of the output array and transmit a bundle including the return value and the active region to the first thread, otherwise, transmit a bundle including the return value and the output array to the first thread.

20. The computer program product of claim 11, further comprising computer-usable program code to:
receive, in the first thread a third native code-generated call to the second thread, the third native code-generated call including a second array write instruction, the third native code-generated call received after the first native code-generated call but before the second native code-generated call;
in response to receipt of the third native code-generated call, store the third native code-generated call in the instruction cache; and
wherein the computer-usable program code to bundle the first and second native code-generated call and transmit the bundled first and second native code-generated call to the second thread is further operable to bundle the first, second, and third native code-generated calls and transmit the bundled first, second, and third native code-generated calls to the second thread.

* * * * *